United States Patent Office 3,484,570
Patented Dec. 16, 1969

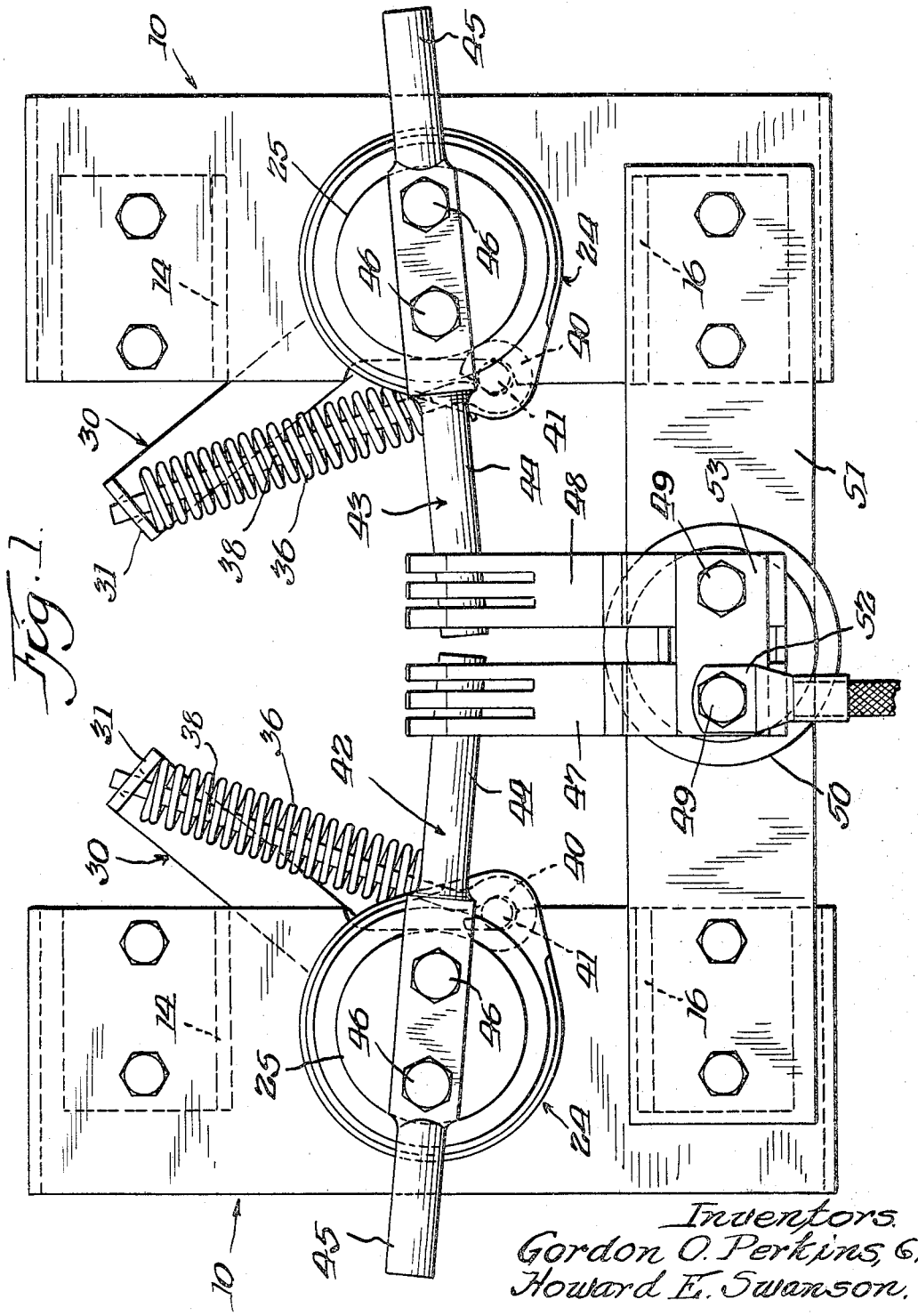

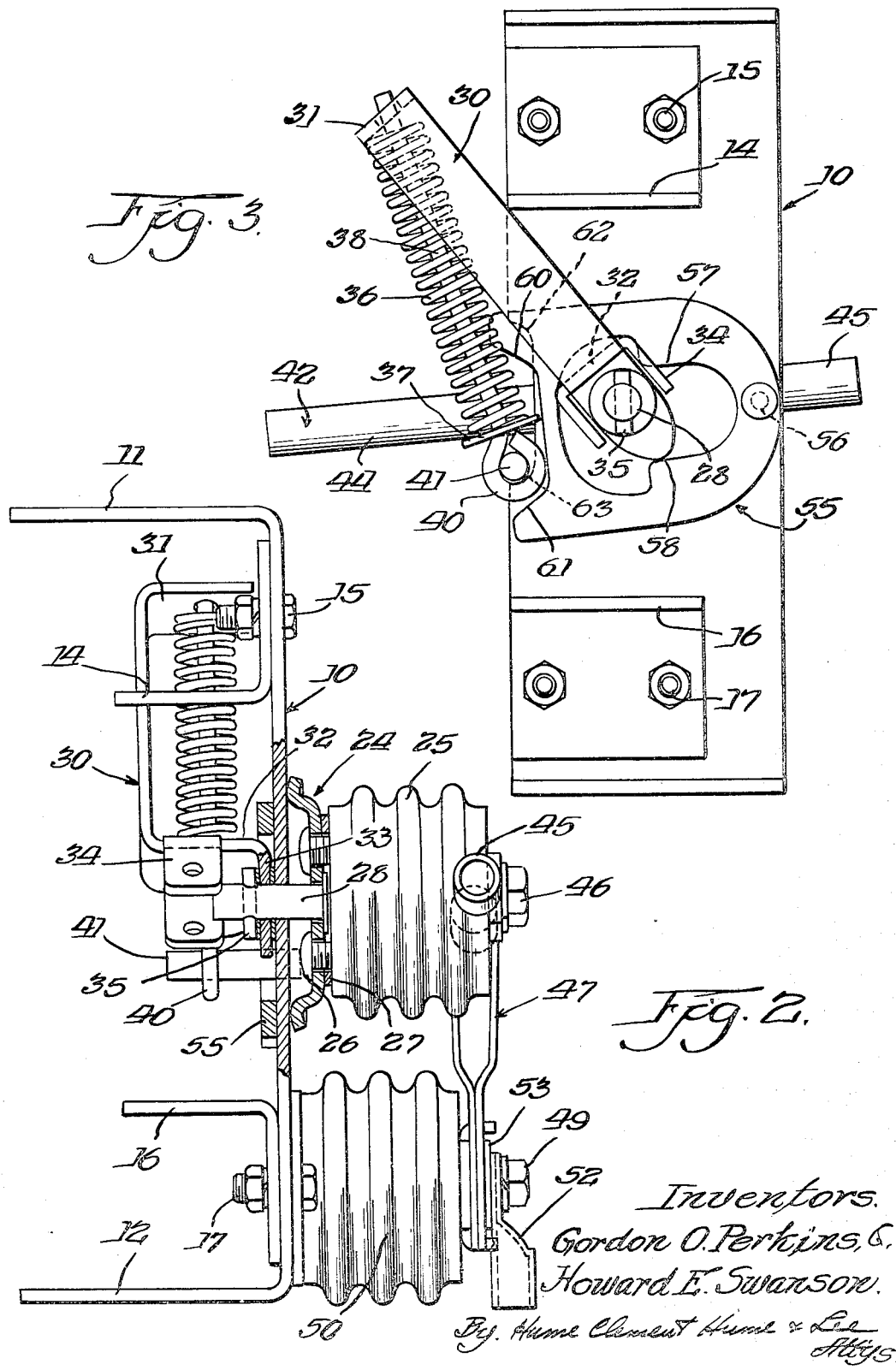

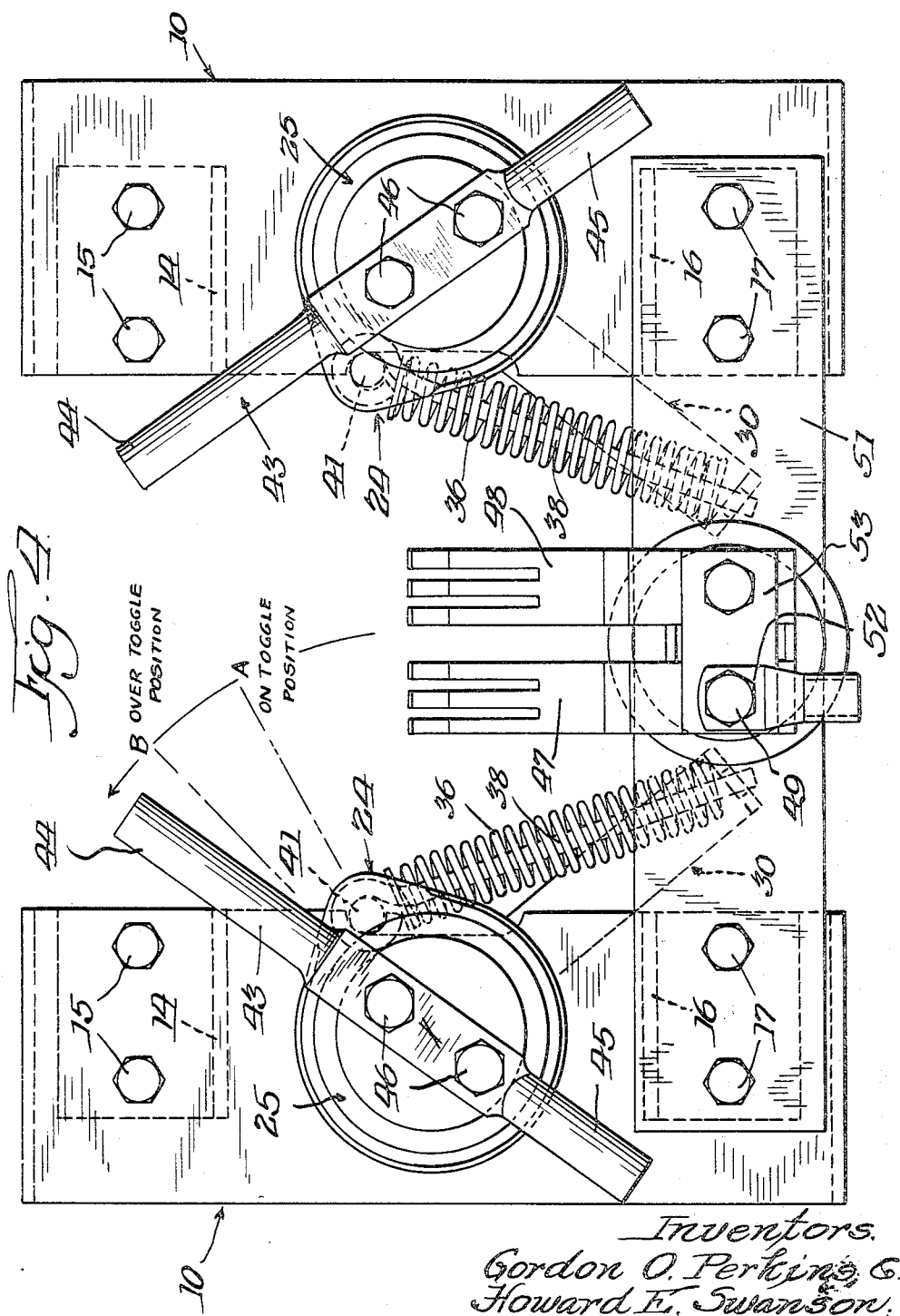

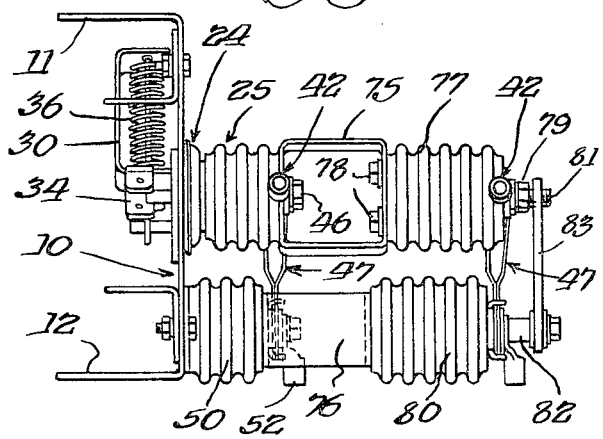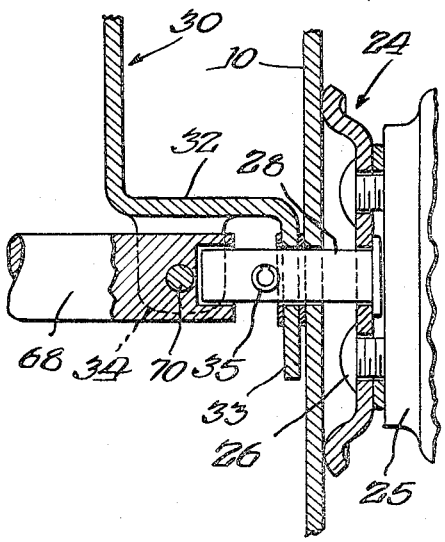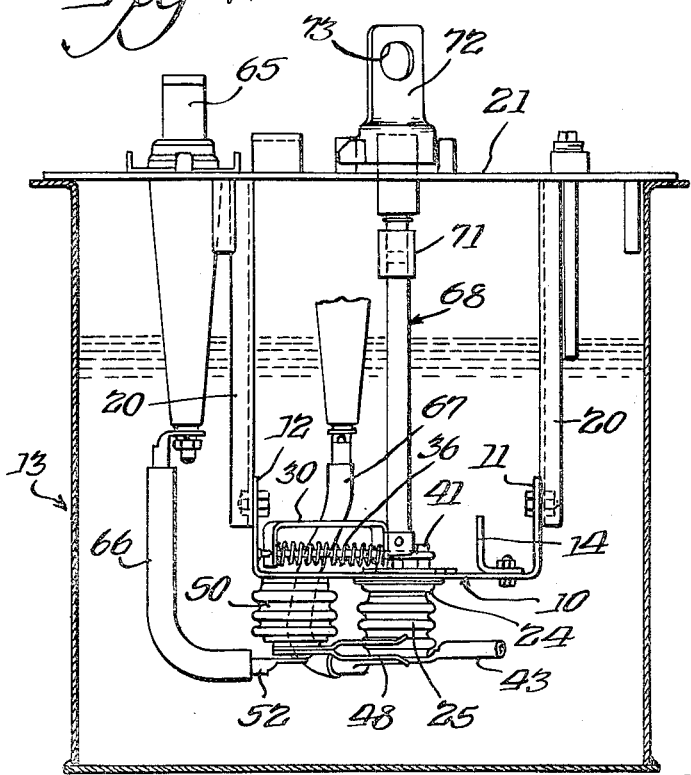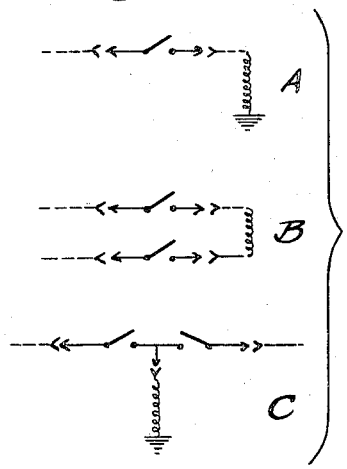

3,484,570
SWITCH FOR ELECTRICAL DISTRIBUTION
SYSTEM AND EQUIPMENT
Gordon O. Perkins, Flossmoor, and Howard E. Swanson, Chicago, Ill., assignors to G & W Electric Specialty Company, Blue Island, Ill., a corporation of Illinois
Filed Dec. 19, 1967, Ser. No. 691,842
Int. Cl. H01h 31/00, 21/04, 21/40
U.S. Cl. 200—48                 7 Claims

ABSTRACT OF THE DISCLOSURE

The electric switch of the invention is designed for residential distribution circuits and the same incorporates a toggle arrangement for snap action of the movable contacts and which is additionally designed to cam the movable contacts in advance of the toggle actuated snap action so as to break any welding or adhesions such as may develop over an extended period of time. The stationary contacts are of the dual type having bifurcated blade portions that move toward each other so as to increase the contact force as high current flows through the blades thereof.

---

The invention relates to switch structure of the toggle type having snap action for performing the switching operation and has reference in particular to electric switch structure designed for residential distribution circuits.

The electic switch device as contemplated by the invention is a low cost, load break switch designed to meet the requirements for switching and isolating in residential distribution circuits. In this type of switch mechanism it is desirable to effect a quick make and break operation and accordingly the structure incorporates a toggle arrangement which will store energy in a coil spring to the maximum extent so that upon release thereof the movable switch contact will be rotated in a positive manner and at a high rate of speed.

Another object of the invention resides in the provision of switch structure as described which will have modular type construction so that any one of many different arrangements can be made from a few basic parts with changes being made in the mounting structure to match, since the mounting structure is necessarily different for different applications.

A further object is to provide switch structure of the toggle actuated type wherein camming means are employed for effecting initial movement of the movable contact in advance of the toggle released coil spring action so as to break any welding or adhesions such as may develop over an extended period of time.

Another object of the invention resides in the provision of switch contact structure of the type described which will embody movable and stationary contacts of improved form and wherein the movable contact is a one piece unit providing both the blade portion and the conductor terminal portion.

Another object is to provide stationary contacts for electric switch structure which are of the dual type having bifurcated blade portions that move toward each other so as to increase the contact force as high current flows through the blades of the contacts.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 1 is a front end elevational view showing the mounting structure for the stationary and movable contacts of a single pole dual switch arrangement embodying the improved features of the invention and wherein the toggle mechanisms are also illustrated with the contacts in closed circuit position;

FIGURE 2 is a vertical side elevational view with parts being shown in section for illustrating the toggle mechanism and the operating shaft connection from the toggle to the movable contact;

FIGURE 3 is an end elevational view looking toward the right in FIGURE 2 and showing the toggle mechanism and which additionally illustrates the camming means for effecting initial movement of the movable contact in advance of coil spring action;

FIGURE 4 is a front end elevational view similar to FIGURE 1 but showing the contacts in an open circuit position;

FIGURE 5 is a side elevational view similar to FIGURE 2 but showing a modification of the invention wherein a pair of movable and a pair of stationary contacts are employed;

FIGURE 6 is a sectional view showing the details of the connection for operatively joining the operator's shaft to the toggle mechanism;

FIGURE 7 is a sectional view through an oil containing tank and which shows in elevation the manner of mounting the switch structure of the invention within the tank and electrically connecting the same to terminals located exteriorly of the tank;

FIGURE 8 comprises several diagrammatic illustrations showing the manner in which the switch of the invention may be employed.

Referring to the drawings it will be observed that the switch structure is mounted by means of a support 10 of U-shaped formation having legs 11 and 12 which extend upwardly as shown in FIGURE 7 for suspending the switch structure within an oil containing tank 13. A stop bracket 14 is fixed to the support 10 by the bolts 15 at the side adjacent the leg 11. A similar stop bracket 16 is fixed by the screws 17 to the support adjacent the leg 18. The extensions 20 suspend the support 10 from the cover 21 which normally closes the top open end of the tank.

As best shown in FIGURE 2, the driving flange 24 is unitary with the insulator 25 being secured to the left hand end of the insulator by the bolts 26 with the washer 27 interposed between. The headed pin 28 is retained by the driving flange 24 and said pin extends through the support 10 to project beyond the support on the left side of the same. On this side of the support 10 there is located the spring carrier 30 which is so shaped as to provide end flanges 31 and 32, a supporting portion 33 and the spaced lugs 34. The pin 28 extends through an opening in the supporting portion 33 and a retaining pin 35 is employed to hold the spring carrier on the pivot pin 28. The carrier and pin are both held to the support 10 with the carrier and also the driving flange being free to rotate on the pin 28 as an axis.

The carrier 30 coacts with the coil spring 36 of the toggle mechanism and said spring at one end seats on the flange 31 of the carrier and on the spring seat 37 at the opposite end of the spring. The spring seat is carried by the rod 38 having the eyelet 40 which engages the pin 41 fixed to and extending from the driving flange 24. The opposite end of the rod 38 passes through an opening in the flange 31 of the carrier. The brackets 14 and 16 act as stops limiting the oscillating movement of the carrier for cocking the toggle mechanism. FIGURE 4 shows the open circuit position of the toggle with the carrier 30 located in an angular down position. In order to cock the toggle to produce the closed circuit position of FIGURE 1, the carrier 30 of the left-most switch is oscillated in a counter-clockwise direction which functions to compress and store energy in the coil spring 36. When the carrier is in line with the pin 41 and with the axis 28 of rotation of the carrier the toggle mechanism is said to be on toggle or on dead center. Upon continued movement of the carrier in a counter-clockwise direction an over-center position will be reached which will result in a release of the spring energy to effect rotation of the driving flange 24. The pin 41 is fixed to said flange and thus the flange functions as the instrumentality which is oscillated by the toggle. With release of the spring energy the driving flange is oscillated into the closed circuit position of FIGURE 1.

The insulator 25 is fixedly secured to the driving flange 24 and said insulator carries at its opposite end the movable contact designated by the numeral 42 for the left hand switch structure as shown in FIGURES 1 and 4, and by the numeral 43 for the right hand switch structure. Each movable contact is identical in construction, being formed as a unit to provide the contact portion 44 and the terminal portion 45. The movable contact is generally tubular with a flattened center part which is fixed to the flat outer surface of the insulator 25 by the securing screws 46.

The stationary contacts 47 and 48 are secured by the screws 49 to an insulator 50. The insulator is in turn secured to the plate element 51 which extends horizontally to bridge the space between the two suspended supports 10 being secured to the supports by the screws 15 and 17. The terminal lug 52 is fastened by one of the screws 49 to the base 53, the base being common to both stationary contacts. Each stationary contact is bifurcated to provide spaced blade portions. By spacing the blade portions, the contact pressure on the engaged contact is increased since the electromagnetic force, when the current is flowing, tends to urge the blade portions in a direction towards each other. When the movable contact 42 is in the circuit closed position of FIGURE 1, the contact portion 44 thereof is located between and in engagement with the blades of the stationary contact 47. In a similar manner, when the movable contact 43 is in circuit closed position, the contact portion 44 of said contact is in engagement with the spaced blades of the stationary contact 48.

To assist the toggle mechanism in its snap action of the movable contact, and particularly initial movement thereof when breaking engagement with the stationary contact, the invention provides camming means in the form of a camming plate 55 as best shown in FIGURE 3. The plate is pivoted at 56 to the support 10 and the substantially annular plate is provided with inside camming surfaces 57 and 58 and with outside camming surfaces 60 and 61. The left hand edge of the support 10 in the vicinity of the camming plate 55 is notched to provide respective corner pockets 62 and 63 which act as stops for the pin 41 and retain the pin at the end of its respective movements. To cock the toggle mechanism with the parts in position as shown in FIGURE 3, the carrier 30 is rotated counter-clockwise and when the carrier is over the pin 41 the same is on dead center. The nose end of the portion 33 of the carrier is thus caused to engage the camming surface 57 of the plate 55 and as the carrier continues in its cocking movement the nose portion will move the cam plate 55 upwardly to cause the exterior cam surface 61 to engage the pin 41. Thus the plate 55 is actually caused to cam the pin and to initiate movement of the driving flange 24 in advance of the release of the toggle mechanism. This camming and initial movement is effected by the operator and is independent of the toggle action although the same facilitates the resulting toggle action. In a return direction of the carrier, the same action of the cam plate 55 is effected, with the only difference being that the nose portion will cam the surface 58 to cause the exterior cam surface 60 to engage and move the pin 41.

Referring to FIGURE 7, the cover 21 retains the terminals such as 65 for electrically connecting the stationary and the movable contacts to outside electrical circuits. From 65 for example, the conductor 66 leads to the lug 52 for the stationary contacts. In a similar manner a terminal such as 65 is provided for the movable contacts and the conductor 67 leads to the terminal end 45 of the movable contacts. The operating shaft for the toggle mechanism is designated by the numeral 68 and said shaft connects with the spring carrier 30 and with the journalling pin 28 as shown in FIGURE 6. The shaft is cored at its base end for receiving the pin 28 and the shaft is fixedly secured to the lugs 34 of the carrier by the pin 70. The connector 71 joins the operating shaft 68 to the extension 72 which is located above the cover 21 of the coil containing tank. The opening 73 in the extension 72 makes possible hook stick cocking of the toggle mechanism from outside the tank.

A modification of the invention is shown in FIGURE 5 wherein a pair of movable contacts are adapted to coact with a pair of stationary contacts. The basic switch structure of FIGURE 1 is repeated in FIGURE 5 with additional insulators and contacts being added by means of the extension brackets 75 and 76. The extension bracket 75 is fixed to the insulator 25 and the second insulator 77 is in turn fixed thereto by the securing screws 78. At the outer right hand end of the insulator 77 the second movable contact such as 42 is secured by means of the securing screws 79. The second stationary contact 47 is supported in a similar manner by means of the extension bracket 76 and the second insulator 80. Center pins 81 and 82 project from the insulators 77 and 80 and the pins are connected by the insulated connecting support 83.

The devices of the invention are usable on transformers or equipment at their terminals as switching devices or as switches used separately in their own confined tank and operated to switch circuits to which they are connected. Many types of connections can be employed since they are basically independent of the switch. In FIGURE 8A a single pole on-off type of switch connection is shown. FIGURE 8B shows a similar type of two pole switch, and in FIGURE 8C the load is center connected to the stationary contacts. The load may be energized from either of two sources or the right and left hand circuits may be part of a loop.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In switch structure of the character described, the combination with a mounting plate, of toggle mechanism positioned on one side of the plate, a driving flange located on the opposite side of the plate, said toggle mechanism including a cocking lever and a coil spring, means extending through the mounting plate and providing an axis for journalling the drive flange and the cocking lever for indpendent rotation, said coil spring having seating relation on the cocking lever at one end thereof and at its other end having operative connection with the driving flange, stop means provided by the mounting plate for limiting oscillating movement of the driving flange, an insulator fixed to the driving flange so as to form an oscillating unit therewith, and a movable contact fixed to the end of the insulator opposite its connection with the driving flange.

2. Switch structure as defined by claim 1, wherein the coil spring is operatively connected to the driving flange by means of a pin fixed to the driving flange and extending to the opposite side of the mounting plate, and a rod providing an eyelet at one end and which has engaged relation with the pin, said rod extending through the coil spring and through an opening in a flange formed on the cocking lever at the seating end of the coil spring.

3. Switch structure as defined by claim 1, additionally including a pin fixed to the driving flange and extending to the opposite side of the mounting plate, a rod having an eyelet at one end and which has an engaged relation with the pin, said rod extending through the coil spring and through an opening in a flange formed on the cocking lever at the seating end of the coil spring, whereby said cocking lever and coil spring are operatively connected to the driving flange, and said mounting plate having an elongated slot formed in one edge thereof for receiving the said pin and which provides the stop means limiting oscillating movement of the pin and thus oscillating movement of the driving flange.

4. Switch structure as defined by claim 1, additionally including a stationary contact supported on the mounting plate by means of an insulator, and wherein the movable contact consists of a tubular member having a flattened center portion by means of which the movable contact is fixed to its insulator.

5. In switch structure of the character described, the combination with a mounting plate, of toggle mechanism positioned on one side of the plate, a driving flange located on the opposite side of the plate, said toggle mechanism including a cocking lever and a coil spring, means extending through the mounting plate and providing an axis for journalling the driving flange and the cocking lever for independent rotation, said coil spring at one end having seating relation on the cocking lever, a pin fixed to the driving flange and extending to the opposite side of the mounting plate, a rod having an eyelet and operatively connecting the spring and cocking lever with the pin and with the driving flange, stop means provided by the mounting plate for limiting oscillating movement of the pin and also the driving flange, an insulator fixed to the driving flange so as to form an oscillating unit therewith, a movable contact fixed to the end of the insulator opposite its connection with the driving flange, a camming plate supported by the mounting plate for pivotal movement on that side of the mounting plate having the cocking lever, said camming plate having cam surfaces for coacting relation with the pin, and said cocking lever having a camming end in the form of a nose portion for engaging the camming plate immediately in advance of toggle release to thereby cam the camming plate to in turn cam the pin and effect movement of the pin and thus the driving flange in advance of toggle release.

6. Switch structure as defined by claim 5, wherein the stop means for limiting oscillating movement of the driving flange consists of a slot formed in one edge of the mounting plate and which receives the said pin.

7. Switch structure as defined by claim 5, additionally including a stationary contact supported on the mounting plate by means of an insulator, and wherein the movable contact consists of a tubular member having a flattened center portion by means of which the movable contact is fixed to its insulator.

References Cited

UNITED STATES PATENTS

| | | | |
|---|---|---|---|
| 2,995,043 | 8/1961 | Lusk et al. | 74—97 |
| 3,164,693 | 1/1965 | Nichols et al. | 200—48 |
| 3,403,565 | 10/1968 | Kovats | 74—97 |

ROBERT K. SCHAEFER, Primary Examiner

H. J. HOHAUSER, Assistant Examiner

U.S. Cl. X.R.

74—97; 200—70, 67